(12) United States Patent
Tan et al.

(10) Patent No.: US 9,110,821 B2
(45) Date of Patent: Aug. 18, 2015

(54) SYSTEMS AND METHODS FOR IMPROVED SHORT MEDIA DEFECT DETECTION

(71) Applicant: LSI Corporation, San Jose, CA (US)

(72) Inventors: Weijun Tan, Longmont, CO (US); Fan Zhang, Milpitas, CA (US); Shaohua Yang, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/243,107

(22) Filed: Apr. 2, 2014

(65) Prior Publication Data

US 2014/0211337 A1    Jul. 31, 2014

Related U.S. Application Data

(63) Continuation-in-part of application No. 13/558,228, filed on Jul. 25, 2012, now Pat. No. 8,732,562.

(60) Provisional application No. 61/907,170, filed on Nov. 21, 2013.

(51) Int. Cl.
*G06F 11/10* (2006.01)
*G11B 20/10* (2006.01)
*G11B 20/18* (2006.01)

(52) U.S. Cl.
CPC .......... *G06F 11/10* (2013.01); *G11B 20/10009* (2013.01); *G11B 20/10287* (2013.01); *G11B 20/1816* (2013.01); *G11B 20/1883* (2013.01); *G11B 20/10296* (2013.01)

(58) Field of Classification Search
CPC ................... G11B 20/1816; G11B 2020/1859; G11B 2020/1863; G11B 20/10055; G11B 20/10287; G11B 20/10296; H03M 13/6331; H03M 13/1102; H03M 13/2957
USPC ................................ 714/794, 755, 780, 795
See application file for complete search history.

(56) References Cited

U.S. PATENT DOCUMENTS

| | | | |
|---|---|---|---|
| 7,237,173 B2 * | 6/2007 | Morita et al. ................. | 714/755 |
| 7,573,794 B2 * | 8/2009 | Fujiwara et al. ........... | 369/53.15 |
| 8,015,499 B2 * | 9/2011 | Kanaoka ....................... | 715/780 |
| 8,122,314 B1 * | 2/2012 | Yang et al. ..................... | 714/752 |
| 8,161,357 B2 * | 4/2012 | Tan et al. ...................... | 714/780 |
| 8,583,981 B2 * | 11/2013 | Varnica et al. ................ | 714/755 |
| 2007/0061687 A1 * | 3/2007 | Hwang .......................... | 714/780 |

* cited by examiner

*Primary Examiner* — James C Kerveros
(74) *Attorney, Agent, or Firm* — Hamilton DeSanctis & Cha

(57) ABSTRACT

Various embodiments of the present invention provide systems and methods for media defect detection. As an example, a method is discusses that includes: receiving a decoded output including a first multi-bit symbol; receiving a detected output including a second multi-bit bit symbol; calculating values based upon respective combinations of the first multi-bit symbol and the second multi-bit symbols; calculating a first product and the second product based upon some of the aforementioned values; and asserting a suspect symbol indicator indicating a probability that the symbol is incorrect when at least one of the first product and the second product is negative.

20 Claims, 5 Drawing Sheets

SYSTEMS AND METHODS FOR IMPROVED SHORT MEDIA DEFECT DETECTION

CROSS REFERENCE TO RELATED APPLICATIONS

The present application claims priority from Provisional Application 61/907,170, filed Nov. 21, 2013, is a continuation in part of U.S. patent application Ser. No. 13/558,228, filed Jul. 25, 2012, now U.S. Pat. No. 8,732,562, entitled "Systems and Methods for Improved Short Media Defect Detection", filed 2012 by Tan et al., all of which are incorporated herein by reference in their entirety.

BACKGROUND OF THE INVENTION

The present inventions are related to systems and methods for transferring information, and more particularly to systems and methods for determining problems related to a medium associated with a data transfer.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any defects associated with the transfer medium. In some cases, data loss caused by defects in the transfer medium can make recovery of data from the transfer medium difficult even for data received from non-defective areas or times. Various approaches have been developed for identifying defects in the transfer medium. Such approaches provide a general ability to identify defects, but in many cases are inaccurate. In the best case, this inaccuracy limits the effectiveness of any defect identification. In the worst case, inaccurate defect detection may actually hamper the data recovery process. The inability to detect short media defects is increased where non-binary symbols are being decoded as such symbols do not exhibit independence between adjacent bits.

Hence, for at least the aforementioned reasons, there exists a need in the art for advanced systems and methods for defect detection.

BRIEF SUMMARY OF THE INVENTION

The present inventions are related to systems and methods for transferring information, and more particularly to systems and methods for determining problems related to a medium associated with a data transfer.

Various embodiments of the present invention provide data processing systems that include: a data detector circuit, a data decoder circuit, and a defect detector circuit. The defect detector circuit includes a non-threshold based data pre-processing circuit, and a binary data detection circuit. The data detector circuit is operable to apply a data detection algorithm to a symbol based data set guided by a decoded output to yield a symbol based detected output. The non-threshold based data pre-processing circuit is operable to pre-process the symbol based detected output to yield a product corresponding to a suspect symbol indicator, and the binary data detection circuit is operable to provide a defect indicator corresponding to a probable defect identified based on the suspect symbol indicator. The data decoder circuit is operable to apply a data decode algorithm to a decoder input derived from the detected output modified based on the defect indicator to update the decoded output. In some cases, the suspect symbol indicator indicates a probability that a symbol is incorrect when a combination of the decoded output and the detected output is negative.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS OF THE INVENTION

Figure 1:
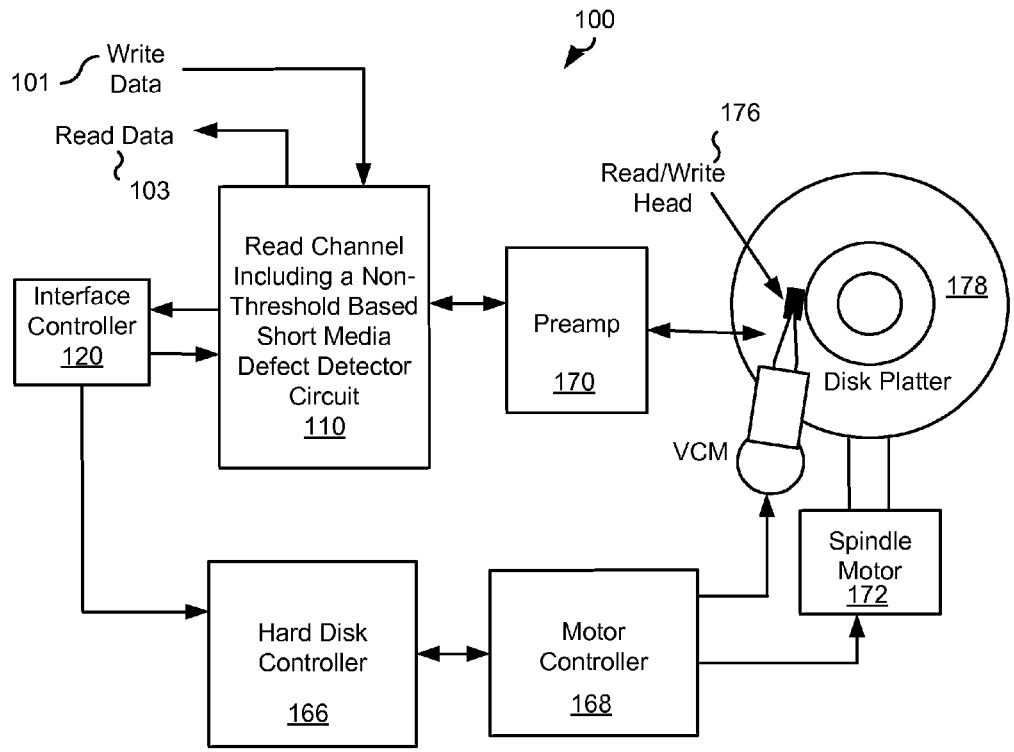
FIG. 1 shows a storage system including a read channel with a short defect detector circuit in accordance with various embodiments of the present invention.

The present inventions are related to systems and methods for transferring information, and more particularly to systems and methods for determining problems related to a medium associated with a data transfer.

Various embodiments of the present invention provide for data processing systems that include media defect detection circuitry. The media defect detection circuitry is capable of detecting short media defects (e.g., defects less than thirty-two bits). In some cases, the data being processed is non-binary and the media defect detection circuitry is tailored for such non-binary data where the successive bits in a processing data input are not independent. The defect detection circuit utilizes an existing media defect detector circuit modified to include a data pre-processing circuit that pre-processes a data input prior to introducing the pre-processed data to the media defect detector circuit.

Various embodiments of the present invention provide data processing systems that include: a data detector circuit, a data decoder circuit, and a defect detector circuit. The defect detector circuit includes a non-threshold based data pre-processing circuit, and a binary data detection circuit. The data detector circuit is operable to apply a data detection algorithm to a symbol based data set guided by a decoded output to yield a symbol based detected output. The non-threshold based data pre-processing circuit is operable to pre-process the symbol based detected output to yield a product corresponding to a suspect symbol indicator, and the binary data detection circuit is operable to provide a defect indicator corresponding to a probable defect identified based on the suspect symbol indicator. The data decoder circuit is operable to apply a data decode algorithm to a decoder input derived from the detected output modified based on the defect indicator to update the decoded output. In some cases, the suspect symbol indicator indicates a probability that a symbol is incorrect when a combination of the decoded output and the detected output is negative.

In some instances of the aforementioned embodiments, the symbol based data set is a series of multi-bit symbols. These multi-bit symbols may be, but are not limited to, two or three bit symbols. In some instances where the multi-bit symbols are two bit symbols and the product includes a first product and a second product, the data pre-processing circuit is further operable to: calculate a first value based upon a first combination of a soft data set corresponding to a symbol of the detected output and a second value based upon a second combination of the soft data set corresponding to the symbol of the detected output; calculate a third value based upon a first combination of a soft data set corresponding to a symbol of the decoded output and a fourth value based upon a second combination of the soft data set corresponding to the symbol of the decoded output; multiply the first value by the third value to yield the first product; multiply the second value by the fourth value to yield the second product; and assert the suspect symbol indicator indicating a probability that the symbol is incorrect when either the first product or the second product is negative.

In some such instances, the soft data set corresponding to the symbol of the detected output includes a first element, a second element, a third element, and a fourth element. Calculating the first value includes: selecting one of the first element and the third element that has the highest value as a first selected value; selecting one of the second element and the fourth element that has the highest value as a second selected value; and subtracting the second selected value from the first selected value to yield the first value. Calculating the second value includes: selecting one of the first element and the second element that has the highest value as a third selected value; selecting one of the third element and the fourth element that has the highest value as a fourth selected value; and subtracting the fourth selected value from the third selected value to yield the second value. In various instances, the soft data set corresponding to the symbol of the decoded output includes a first element, a second element, a third element, and a fourth element. Calculating the third value includes: selecting one of the first element and the third element that has the highest value as a first selected value; selecting one of the second element and the fourth element that has the highest value as a second selected value; and subtracting the second selected value from the first selected value to yield the third value. Calculating the fourth value includes: selecting one of the first element and the second element that has the highest value as a third selected value; selecting one of the third element and the fourth element that has the highest value as a fourth selected value; and subtracting the fourth selected value from the third selected value to yield the fourth value.

Other embodiments of the present invention provide methods for data processing that include: receiving a decoded output including a first multi-bit symbol; receiving a detected output including a second multi-bit bit symbol; using a pre-processing circuit, calculating a first value based upon a first combination of a soft data set corresponding to the first multi-bit symbol a second value based upon a second combination of the soft data set corresponding to the first multi-bit symbol; using the pre-processing circuit, calculating the third value based upon a first combination of a soft data set corresponding to the second multi-bit symbol and a fourth value based upon a second combination of the soft data set corresponding to the second multi-bit symbol; multiplying the first value by the third value to yield a first product; multiplying the second value by the fourth value to yield a second product; and asserting the suspect symbol indicator indicating a probability that the symbol is incorrect when either the first product or the second product is negative.

Yet other embodiments of the present invention provide data processing systems that include: a data detector circuit, a data decoder circuit, and a defect detector circuit. The defect detector circuit includes a pre-processing circuit, and a binary data detection circuit. The data detector circuit is operable to apply a data detection algorithm to a symbol based data set guided by a decoded output to yield a detected output. The decoded output includes at least a first two bit symbol, and the detected output includes at least a second two bit symbol. The pre-processing circuit is operable to: calculate a first value based upon a first combination of a soft data set corresponding to the first two bit symbol a second value based upon a second combination of the soft data set corresponding to the first two bit symbol; calculate the third value based upon a first combination of a soft data set corresponding to the second two bit symbol and a fourth value based upon a second combination of the soft data set corresponding to the second two bit symbol; multiply the first value by the third value to yield a first product; multiply the second value by the fourth value to yield a second product; and assert a suspect symbol indicator indicating a probability that the symbol is incorrect when either the first product or the second product is negative. The binary data detection circuit operable to provide a defect indicator corresponding to a probable defect identified based on the suspect symbol indicator. The data decoder circuit is operable to apply a data decode algorithm to a decoder input derived from the detected output modified based on the defect indicator to yield the decoded output.

Turning to FIG. 1, a storage system 100 including a read channel circuit 110 having a short media defect detector circuit is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103.

As part of processing data accessed from disk platter 178, read channel circuit 110 performs a media defect detection process operable to determine whether received data is associated with a defective region of disk platter 178. This media defect detection includes pre-processing a detected output from a data detector circuit, and subsequently determining a media defect based upon a combination of the pre-processed data and a decoded output from a data decoder circuit. When a media defect is detected, soft data corresponding to the location of the detected media defects are scaled to reduce the impact of the media defect. In some embodiments of the present invention, the data processing circuit including the short media defect detector circuit may be implemented similar to that discussed below in relation to FIG. 2 or FIG. 4, and/or may apply data processing similar to that discussed below in relation to FIG. 3 or FIGS. 5a-5b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
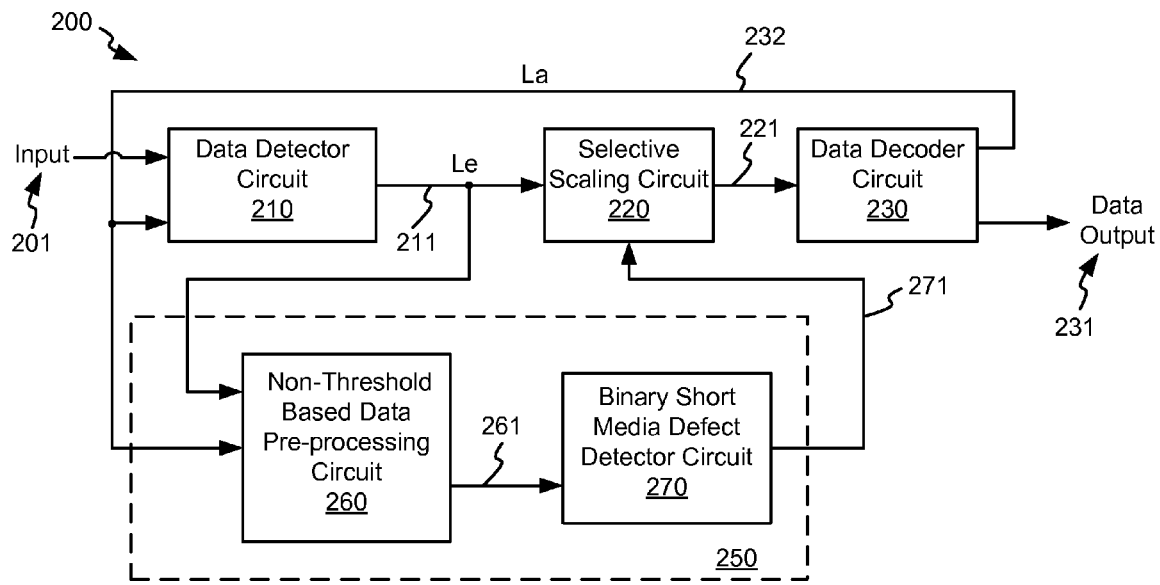
FIG. 2 depicts a data processing circuit including a short defect detector circuit in accordance with various embodiments of the present invention.

Turning to FIG. 2 depicts a data processing circuit 200 including a short defect detector circuit 250 in accordance with various embodiments of the present invention. Data processing circuit 200 includes a data detector circuit 210 that applies a data detection algorithm to a data input 201 guided by a soft decoded output (La) 232. In some embodiments of the present invention, data input 201 is derived from a storage medium. Based upon the disclosure provided herein, one of ordinary skill in the art will recognize a variety of sources for data input 201. Data detector circuit 210 may be, but is not limited to, a maximum a posteriori data detector circuit, or a Viterbi algorithm data detector circuit. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Application of the data detection algorithm by data detector circuit 210 yields a detected output (Le) 211.

Detected output 211 and soft decoded output 232 are provided to a non-threshold based data pre-processing circuit 260 that is operable to modify a symbol based information set into a binary based information set. As used herein, the phrase, "non-threshold based data pre-processing circuit" is any circuit known in the art that receives soft data corresponding to a non-binary symbol and processes the soft data to yield a product without comparing to a value other than a value derived from the soft data. Elements of soft decoded output (La) 232 and detected output (Le) 211 corresponding to each symbol are first combined to yield soft data values for each bit of the symbols. For example, where two bit symbols are processed by data decoder circuit 230, there are four soft data values for each symbol of detected output 211 (i.e., LeQ[0], LeQ[1], LeQ[2], LeQ[3]) and four soft data values for each symbol of soft decoded output 232 (i.e., LaQ[0], LaQ[1], LaQ[2], LaQ[3]). Combinations of the aforementioned soft data values are calculated in accordance with the following pseudocode that repeats to process each symbol (i) of a sector:

```
//process each two bit symbol in the sector//
For(i=0 to End of Sector){
    //calculate the maximum of LaQ[0], LaQ[2] minus the maximum of LaQ[1] LaQ[3]//
    La1[i]=max(LaQ[i*4], LaQ[(i*4)+2])–max(LaQ[(i*4)+1], LaQ[(i*4)+3]);
    //calculate the maximum of LaQ[0], LaQ[1] minus the maximum of LaQ[2], LaQ[3]//
    La2[i]=max(LaQ[i*4], LaQ[(i*4)+1])–max(LaQ[(i*4)+2], LaQ[(i*4)+3]);
    //calculate the maximum of LeQ[0], LeQ[2] minus the maximum of LeQ[1] LeQ[3]//
    Le1[i]=max(LeQ[i*4], LeQ[(i*4)+2])–max(LeQ[(i*4)+1], LeQ[(i*4)+3]);
    //calculate the maximum of LeQ[0], LeQ[1] minus the maximum of LeQ[2], LeQ[3]//
    Le2[i]=max(LeQ[i*4], LeQ[(i*4)+1])–max(LeQ[(i*4)+2], LeQ[(i*4)+3]);
    //calculate the minimum of the product of La1[i]*Le1[i] and La2[i]*Le2[i]//
    product = min[(La1[i]*Le1[i]), (La2[i]*Le2[i])];
    // Set suspect symbol indicator 261//
    If(product <0){
    //there was a divergence between La and Le and therefore the symbol is likely incorrect//
        assert suspect symbol indicator 261;
    }
    Else {
    //there was not a divergence between La and Le and therefore the symbol is likely correct//
        de-assert suspect symbol indicator 261;
    }
```

Of note, the aforementioned algorithm can be expanded to handle symbols of three bits or more.

Suspect symbol indicator 261 is provided from non-threshold based data pre-processing circuit 260 to short media defect detector circuit 270. Binary media defect detector circuit 270 may be any defect detector circuit known in the art that operates on a series of binary data to yield the location of a potential media defect in relation to the series of received data. In one particular embodiment of the present invention, binary media defect detector circuit 270 may be implemented similar to that disclosed in U.S. Pat. No. 8,201,051 entitled "Method for Detecting Short Burst Errors in LDPC System", issued Jun. 12, 2012 to Tan et al. The entirety of the aforementioned reference is incorporated herein by reference for all purposes.

When binary media defect detector circuit 270 identifies a media defect it asserts a defect indicator 271 to a scaling circuit 220. Selective scaling circuit 220 delays detected output 211 to align it with defect indicator 271. Where defect indicator 271 is asserted, selective scaling circuit 220 applies a symbol by symbol scaling to each symbol in detected output 211 that corresponds to defect indicator 271. This scaling operates to modify soft data associated with the effected symbols to reduce the probability that the symbol is considered properly found. By doing this, the likelihood that an effected symbol negatively impacts processing of the data set is reduced and the likelihood that the symbol will be modified by later processing is increased. Selective scaling circuit 220 provides a scaled output 221 to a data decoder circuit 230.

Data decoder circuit 230 applies a data decode algorithm to scaled output 221 to yield a decoded output that includes soft decoded output 232. In some embodiments of the present invention, data decoder circuit 230 is a low density parity check decoder circuit as are known in the art. Where the decoded output converges (i.e., yields the original data set as indicated by the lack of remaining errors), it is provided as a data output 231.

Figure 3:
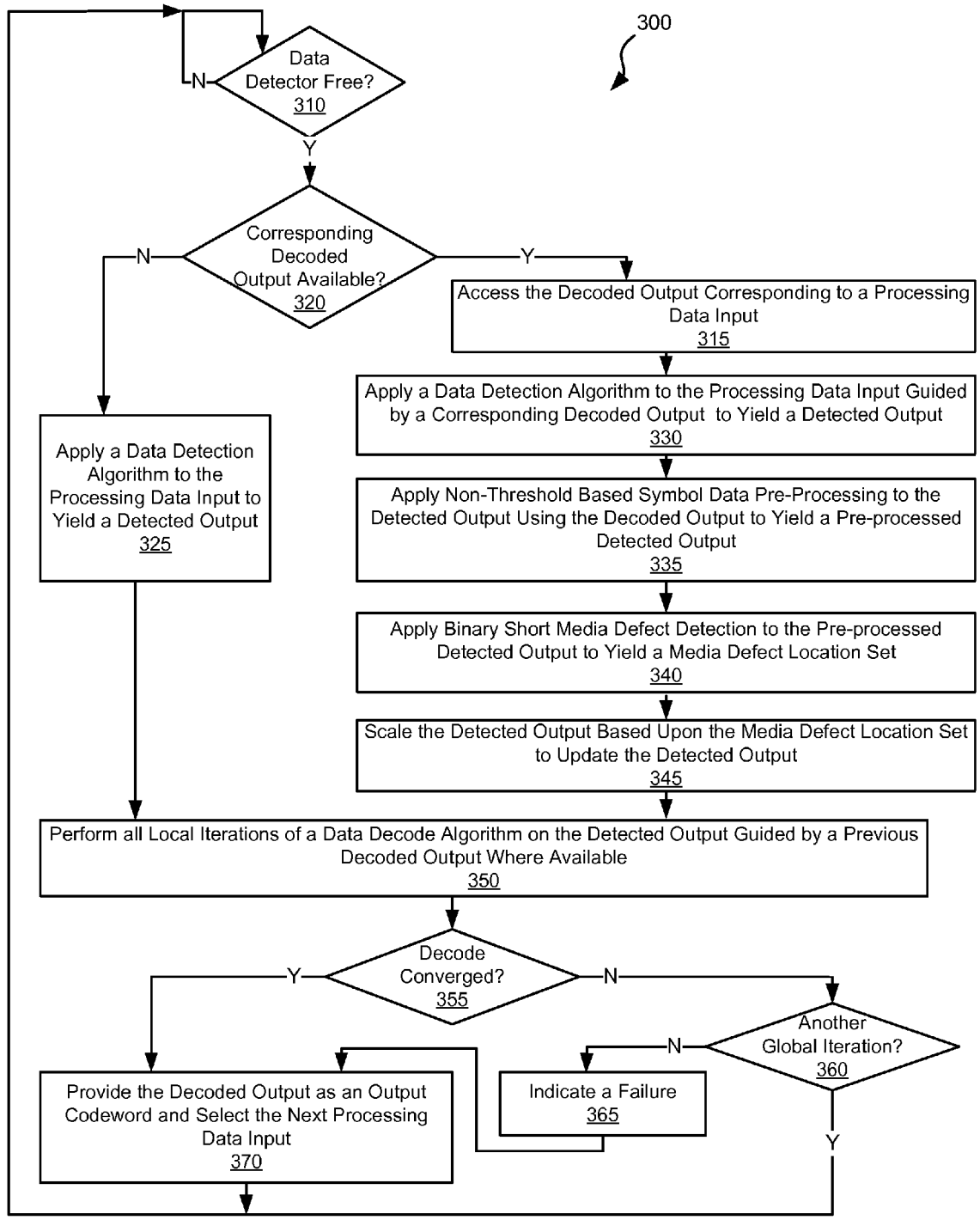
FIG. 3 is a flow diagram showing a method in accordance with some embodiments of the present invention for data processing including short media defect detection.

Turning to FIG. 3, a flow diagram 300 shows a method in accordance with some embodiments of the present invention for data processing including short media defect detection. Following flow diagram 300, it is determined whether a data detector circuit is available to process a newly received data set or a data set that has already been subject to one or more prior global iterations (block 310). As used herein, the phrase "global iteration" is used in its broadest sense to mean application of both a data detection algorithm and a data decode algorithm. Also, as used herein, the phrase "local iteration' is used in its broadest sense to mean an application of the data decode algorithm. In some instances of the present invention, one or more local iterations may be performed for each global iteration.

Where a data detector circuit is available (block 310), a processing data input is accessed and it is determined whether a decoded output corresponding to the accessed processing data input exists (block 320). Such a decoded output is available as a result from a preceding global iteration applied to the same processing data input. The processing data input may be, for example, derived from a storage medium. Where a corresponding decoded output is not available (block 320), a data detection algorithm is applied to the processing data input to yield a detected output (block 325). The data detection algorithm may be, but is not limited to, a Viterbi data detection algorithm or a maximum a posteriori data detection algorithm as are known in the art. Based upon the disclosure provided herein, one of ordinary skill in the art will recognize a variety of data detection algorithms that may be used in relation to different embodiments of the present invention.

Alternatively, where a corresponding decoded output is available (block 320) it is accessed (block 315) and a data detection algorithm is applied to the processing data input guided by the corresponding decoded output to yield a detected output (block 330). Such a corresponding decoded output is available for the second or later global iterations for a given processing data input.

A non-threshold based symbol data pre-processing is applied to the detected output to yield a suspect symbol indicator (block 335). The suspect symbol indicator is asserted to indicate that a symbol is possibly incorrect based upon a divergence between the detected output and the decoded output. In particular, elements of the soft data included in the decoded output (La) and elements of the soft data included in the detected output (Le) corresponding to each symbol are first combined to yield soft data values for each bit of the symbols. For example, where two bit symbols are processed by the data decoder circuit, there are four soft data values for each symbol of the detected output (i.e., LeQ[0], LeQ[1], LeQ[2], LeQ[3]) and four soft data values for each symbol of the decoded output (i.e., LaQ[0], LaQ[1], LaQ[2], LaQ[3]). Combinations of the aforementioned soft data values are calculated in accordance with the following pseudocode that repeats to process each symbol (i) of a sector:

```
//process each two bit symbol in the sector//
For(i=0 to End of Sector){
    //calculate the maximum of LaQ[0], LaQ[2] minus the maximum of LaQ[1] LaQ[3]//
    La1[i]=max(LaQ[i*4], LaQ[(i*4)+2])-max(LaQ[(i*4)+1], LaQ[(i*4)+3]);
    //calculate the maximum of LaQ[0], LaQ[1] minus the maximum of LaQ[2], LaQ[3]//
    La2[i]=max(LaQ[i*4], LaQ[(i*4)+1])-max(LaQ[(i*4)+2], LaQ[(i*4)+3]);
    //calculate the maximum of LeQ[0], LeQ[2] minus the maximum of LeQ[1] LeQ[3]//
    Le1[i]=max(LeQ[i*4], LeQ[(i*4)+2])-max(LeQ[(i*4)+1], LeQ[(i*4)+3]);
    //calculate the maximum of LeQ[0], LeQ[1] minus the maximum of LeQ[2], LeQ[3]//
    Le2[i]=max(LeQ[i*4], LeQ[(i*4)+1])-max(LeQ[(i*4)+2], LeQ[(i*4)+3]);
    //calculate the minimum of the product of La1[i]*Le1[i] and La2[i]*Le2[i]//
    product = min[(La1[i]*Le1[i]), (La2[i]*Le2[i])];
    // Set the suspect symbol indicator//
    If(product <0){
    //there was a divergence between La and Le and therefore the symbol is likely incorrect//
        assert the suspect symbol indicator;
    }
    Else {
    //there was not a divergence between La and Le and therefore the symbol is likely correct//
        de-assert the suspect symbol indicator;
    }
```

Of note, the aforementioned algorithm can be expanded to handle symbols of three bits or more.

A binary short media defect detection is applied to the suspect symbol indicator to determine whether a media defect is likely, and if so to provide a media defect location set (block 340). Such a media defect location set indicates which data in the processing data set corresponds to the likely media defect. The binary short media defect detection may be any media defect detection process known in the art. In one particular embodiment of the present invention, the binary media defect detection processed may be done similar to that disclosed in U.S. Pat. No. 8,201,051 entitled "Method for Detecting Short Burst Errors in LDPC System", issued Jun. 12, 2012 to Tan et al. The entirety of the aforementioned reference is incorporated herein by reference for all purposes.

Symbols of the detected output corresponding to the media defect location set are scaled to update the detected output (block 345). This scaling operates to modify soft data associated with the effected symbols to reduce the probability that the symbol is considered properly found. By doing this, the likelihood that an effected symbol negatively impacts processing of the data set is reduced and the likelihood that the symbol will be modified by later processing is increased.

All local iterations of a data decode algorithm are then applied to the detected output guided by a previous decoded output where available (block 350). This process generates an updated decoded output that may be used during subsequent global iterations where it does not converge (i.e., have no remaining unsatisfied checks). In some embodiments of the present invention, the data decode algorithm is a low density parity check algorithm as is known in the art. It is determined whether the data decode algorithm converged (block 355). Where the data decode algorithm converged (block 355), the decoded output is provided as an output codeword, and the next processing data input is selected for processing (block 370). Alternatively, where the data decode algorithm failed to converge (block 355), it is determined whether another global iteration is allowed (block 360). Where another global iteration is not allowed (block 360), a failure is indicated (block 361) and the decoded output is provided as an output codeword, and the next processing data input is selected for processing (block 370). In contrast, where another global iteration is allowed (block 360), a subsequent location iteration is applied to the same processing data input guided by the results of the preceding global iteration.

Figure 4:
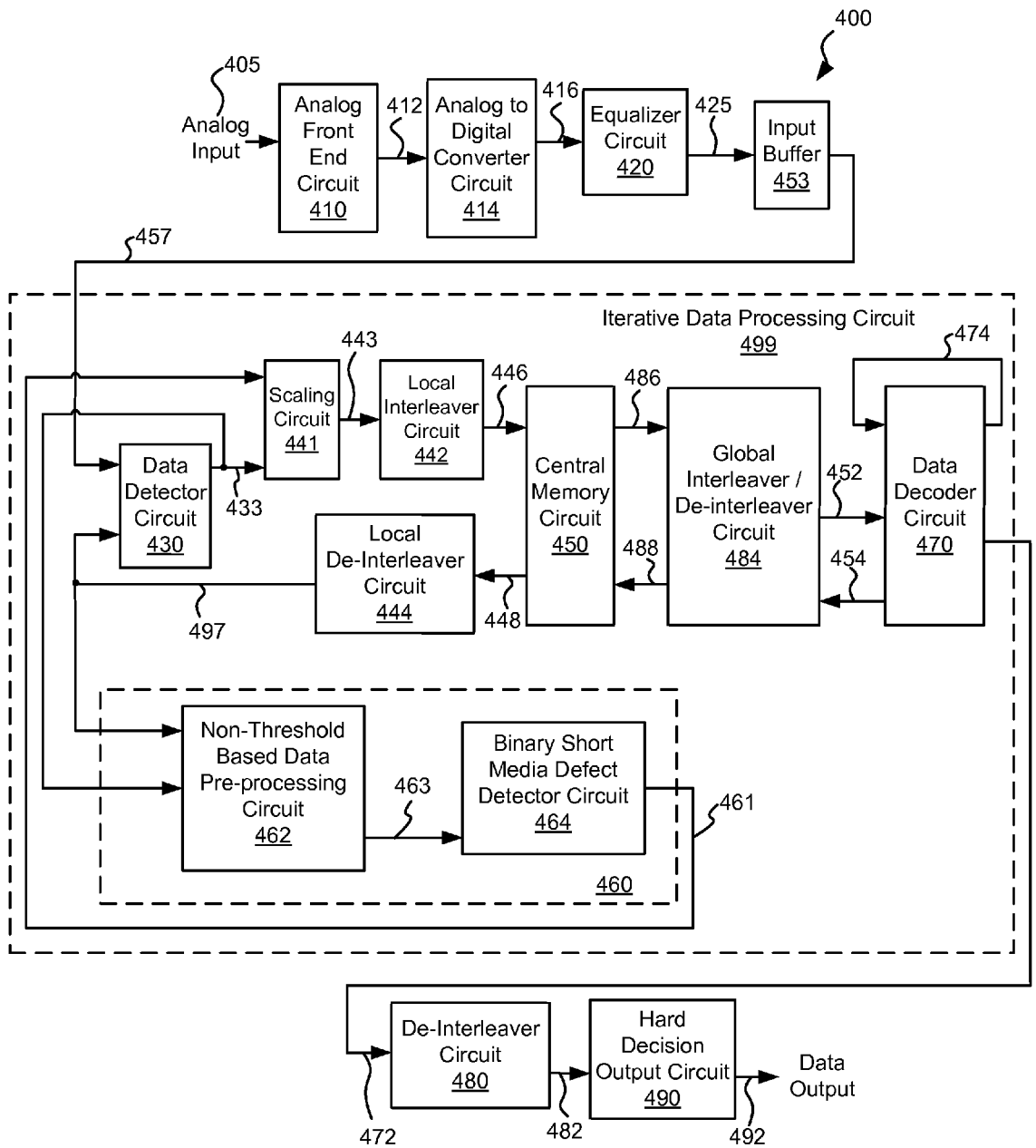
FIG. 4 shows another data processing circuit including a short defect detector circuit in accordance with various embodiments of the present invention.

Turning to FIG. 4, another data processing circuit 400 including a short defect detector circuit 460 (shown in dashed lines) is shown in accordance with various embodiments of the present invention. Data processing circuit 400 includes an analog front end circuit 410 that receives an analog signal 405. Analog front end circuit 410 processes analog signal 405 and provides a processed analog signal 412 to an analog to digital converter circuit 414. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410. In some cases, analog signal 405 is derived from a read/write head assembly (not shown) that is disposed in relation to a storage medium (not shown). Based upon the disclosure provided herein, one of ordinary skill in the art will recognize a variety of media from which analog signal 405 may be derived.

Analog to digital converter circuit 414 converts processed analog signal 412 into a corresponding series of digital samples 416. Analog to digital converter circuit 414 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 416 are provided to an equalizer circuit 420. Equalizer circuit 420 applies an equalization algorithm to digital samples 416 to yield an equalized output 425. In some embodiments of the present invention, equalizer circuit 420 is a digital finite impulse response filter circuit as are known in the art. It may be possible that equalized output 425 may be received directly from a storage device in, for example, a solid state storage system. In such cases, analog front end circuit 410, analog to digital converter circuit 414 and equalizer circuit 420 may be eliminated where the data is received as a digital data input.

Equalized output 425 is stored to an input buffer 453 that includes sufficient memory to maintain one or more codewords until processing of that codeword is completed through an iterative data processing circuit 499 (outlined by dashed lines) including, where warranted, multiple global iterations (passes through both a data detector circuit 430 and a data decoder circuit 370) and/or local iterations (passes through data decoder circuit 470 during a given global iteration). An output 457 is provided to a data detector circuit 430

Data detector circuit 430 may be a single data detector circuit or may be two or more data detector circuits operating in parallel on different codewords (i.e., data sets). Whether it is a single data detector circuit or a number of data detector circuits operating in parallel, data detector circuit 430 is operable to apply a data detection algorithm to a received codeword or data set. In some embodiments of the present invention, data detector circuit 430 is a Viterbi algorithm data detector circuit as are known in the art. In other embodiments of the present invention, data detector circuit 430 is a maximum a posteriori data detector circuit as are known in the art. Based upon the disclosure provided herein, one of ordinary skill in the art will recognize a variety of data detector circuits that may be used in relation to different embodiments of the present invention. In some cases, one data detector circuit included in data detector circuit 430 is used to apply the data detection algorithm to the received codeword for a first global iteration applied to the received codeword, and another data detector circuit included in data detector circuit 430 is operable apply the data detection algorithm to the received codeword guided by a decoded output accessed from a central memory circuit 450 on subsequent global iterations.

Upon completion of application of the data detection algorithm to the received codeword (i.e., processing data input) on the first global iteration, data detector circuit 430 provides a detector output 433. Detector output 433 includes soft data (La). As used herein, the phrase "soft data" is used in its broadest sense to mean reliability data with each instance of the reliability data indicating a likelihood that a corresponding bit position or symbol has been correctly detected. In some embodiments of the present invention, the soft data or reliability data is log likelihood ratio data as is known in the art. Detected output 433 is provided to a local interleaver circuit 442 via a scaling circuit 441. Scaling circuit 441 operates to scale one or more symbols in detected output 433 corresponding to a media defect as indicated by a defect indicator 461. This scaling operates to modify soft data associated with the effected symbols of detector output 433 to reduce the probability that the symbol is considered properly found. By doing this, the likelihood that an effected symbol negatively impacts processing of the codeword is reduced and the likelihood that the symbol will be modified by later processing is increased. Scaling circuit 441 provides a scaled detected output 443 to local interleaver circuit 442. Where no defects are indicated by defect indicator 461, scaled detected output 443 is the same as detected output 433.

Local interleaver circuit 442 is operable to shuffle sub-portions (i.e., local chunks) of the data set included as detected output and provides an interleaved codeword 446 that is stored to central memory circuit 450. Interleaver circuit 442 may be any circuit known in the art that is capable of shuffling data sets to yield a re-arranged data set. Interleaved codeword 446 is stored to central memory circuit 450.

Once data decoder circuit 470 is available, a previously stored interleaved codeword 446 is accessed from central memory circuit 450 as a stored codeword 486 and globally interleaved by a global interleaver/de-interleaver circuit 484. Global interleaver/De-interleaver circuit 484 may be any circuit known in the art that is capable of globally rearranging codewords. Global interleaver/De-interleaver circuit 484 provides a decoder input 452 into data decoder circuit 470. In some embodiments of the present invention, data decoder circuit 470 is a low density parity check decoder circuit as are known in the art. Application of the data decode algorithm by data decoder circuit 470 yield a decoded output 474. In cases where the decoded output 474 fails to converge (i.e., failed to yield the originally written data set) and another local iteration (i.e., another pass through data decoder circuit 470) is desired, data decoder circuit 470 re-applies the data decode algorithm to decoder input 452 guided by decoded output 474. This continues until either a maximum number of local iterations is exceeded or decoded output 474 converges.

Where decoded output 474 fails to converge and a number of local iterations through data decoder circuit 470 exceeds a threshold, the resulting decoded output is provided as a decoded output 454 back to central memory circuit 450 where it is stored awaiting another global iteration through a data detector circuit included in data detector circuit 430. Prior to storage of decoded output 454 to central memory circuit 450, decoded output 454 is globally de-interleaved to yield a globally de-interleaved output 488 that is stored to central memory circuit 450. The global de-interleaving reverses the global interleaving earlier applied to stored codeword 486 to yield decoder input 452. When a data detector circuit included in data detector circuit 430 becomes available, a previously stored de-interleaved output 488 accessed from central memory circuit 450 and locally de-interleaved by a de-interleaver circuit 444. De-interleaver circuit 444 re-arranges decoder output 448 to reverse the shuffling originally performed by interleaver circuit 442. A resulting de-interleaved output 497 is provided to data detector circuit 430 where it is used to guide subsequent detection of a corresponding data set previously received as equalized output 425.

Alternatively, where the decoded output converges (i.e., yields the originally written data set), the resulting decoded output is provided as an output codeword 472 to a de-interleaver circuit 480. De-interleaver circuit 480 rearranges the data to reverse both the global and local interleaving applied to the data to yield a de-interleaved output 482. De-interleaved output 482 is provided to a hard decision output circuit 490. Hard decision output circuit 490 is operable to re-order data sets that may complete out of order back into their original order. Ultimately, hard decision output circuit 490 provides the converged codeword as a data output to a recipient device (not shown).

Iterative data processing circuit 499 includes short defect detector circuit 460 that is operable to identify one or more likely defective regions on a medium from which analog signal 405 is derived. Such defective regions are indicated by defect indicator 461 provided to scaling circuit 441. Short defect detector circuit 460 includes data pre-processing circuit 462 and a binary media defect detector circuit 464.

De-interleaved output (La) 497 (i.e., a version of decoded output 454) and detected output (Le) 433 are provided to non-threshold based data pre-processing circuit 462 that is operable to provide a suspect symbol indicator 463. In particular, elements of de-interleaved output (La) and detected output (Le) corresponding to each symbol are first combined to yield soft data values for each bit of the symbols. For example, where two bit symbols are processed by data decoder circuit 470, there are four soft data values for each symbol of detected output 433 (i.e., LeQ[0], LeQ[1], LeQ[2], LeQ[3]) and four soft data values for each symbol of de-interleaved output 497 (i.e., LaQ[0], LaQ[1], LaQ[2], LaQ[3]). Combinations of the aforementioned soft data values are calculated in accordance with the following pseudocode that repeats to process each symbol (i) of a sector:

```
//process each two bit symbol in the sector//
For(i=0 to End of Sector){
    //calculate the maximum of LaQ[0], LaQ[2] minus the maximum of LaQ[1] LaQ[3]//
    La1[i]=max(LaQ[i*4], LaQ[(i*4)+2])-max(LaQ[(i*4)+1], LaQ[(i*4)+3]);
    //calculate the maximum of LaQ[0], LaQ[1] minus the maximum of LaQ[2], LaQ[3]//
    La2[i]=max(LaQ[i*4], LaQ[(i*4)+1])-max(LaQ[(i*4)+2], LaQ[(i*4)+3]);
    //calculate the maximum of LeQ[0], LeQ[2] minus the maximum of LeQ[1] LeQ[3]//
    Le1[i]=max(LeQ[i*4], LeQ[(i*4)+2])-max(LeQ[(i*4)+1], LeQ[(i*4)+3]);
    //calculate the maximum of LeQ[0], LeQ[1] minus the maximum of LeQ[2], LeQ[3]//
    Le2[i]=max(LeQ[i*4], LeQ[(i*4)+1])-max(LeQ[(i*4)+2], LeQ[(i*4)+3]);
    //calculate the minimum of the product of La1[i]*Le1[i] and La2[i]*Le2[i]//
    product = min[(La1[i]*Le1[i]), (La2[i]*Le2[i])];
    // Set suspect symbol indicator 463//
    If(product <0){
    //there was a divergence between La and Le and therefore the symbol is likely incorrect//
        assert suspect symbol indicator 463;
    }
    Else {
    //there was not a divergence between La and Le and therefore the symbol is likely correct//
        de-assert suspect symbol indicator 463;
    }
```

Of note, the aforementioned algorithm can be expanded to handle symbols of three bits or more.

Suspect symbol indicator 463 is provided from non-threshold based data pre-processing circuit 462 to binary media defect detector circuit 464. Binary media defect detector circuit 464 may be any defect detector circuit known in the art that operates on a series of binary data to yield the location of a potential media defect in relation to the series of received data. In one particular embodiment of the present invention, binary media defect detector circuit 464 may be implemented similar to that disclosed in U.S. Pat. No. 8,201,051 entitled "Method for Detecting Short Burst Errors in LDPC System", issued Jun. 12, 2012 to Tan et al. The entirety of the aforementioned reference is incorporated herein by reference for all purposes.

When binary media defect detector circuit 464 identifies a media defect it asserts a defect indicator 461 to scaling circuit 441. Scaling circuit 441 delays detected output 433 to align it with defect indicator 461. Where defect indicator 461 is asserted, scaling circuit 441 applies a symbol by symbol scaling to each symbol in detected output 433 that corresponds to defect indicator 461.

Figure 5A:
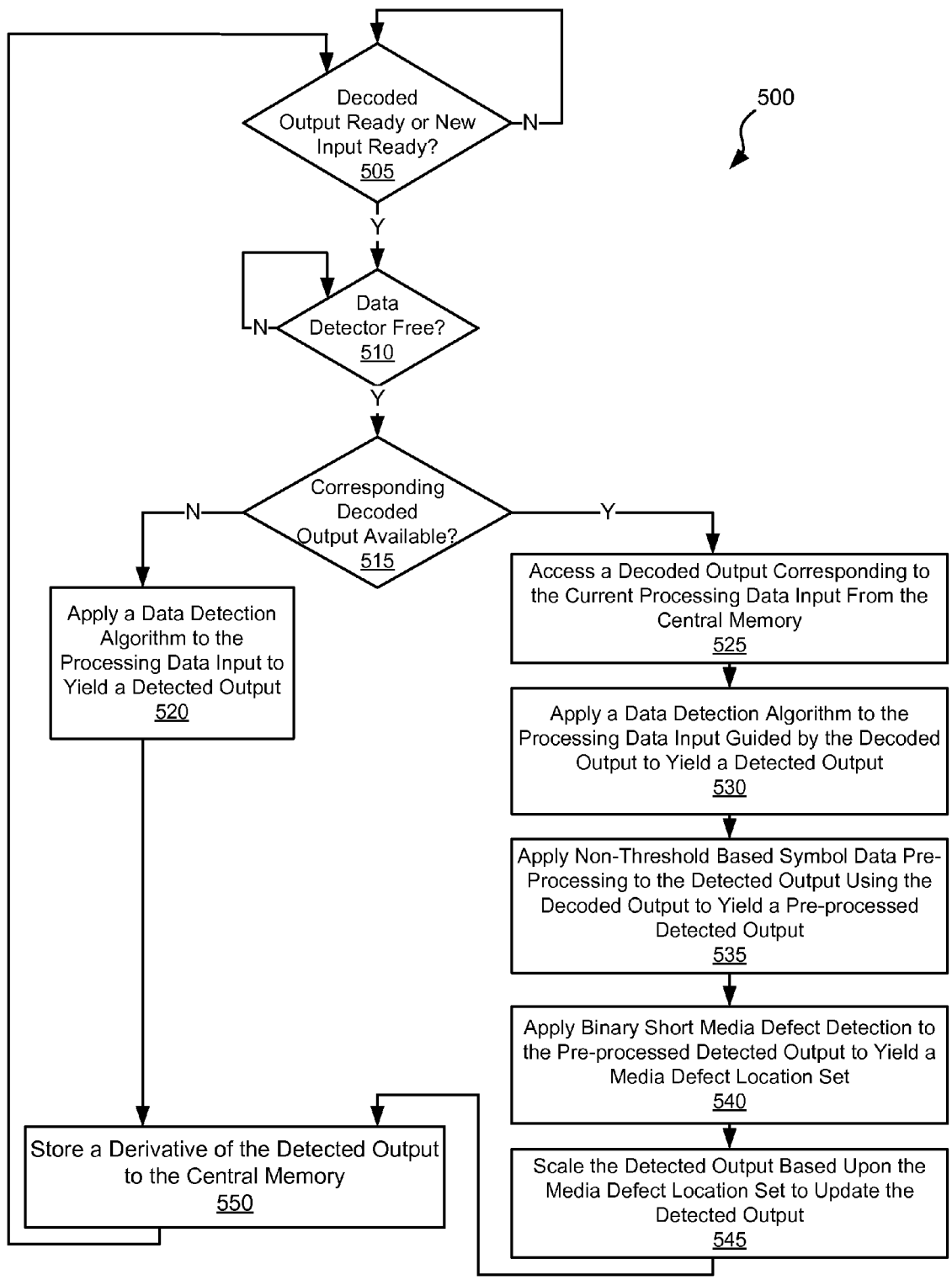
FIGS. 5a-5b are flow diagrams showing a method in accordance with one or more embodiments of the present invention for data processing including short media defect detection.
Figure 5B:
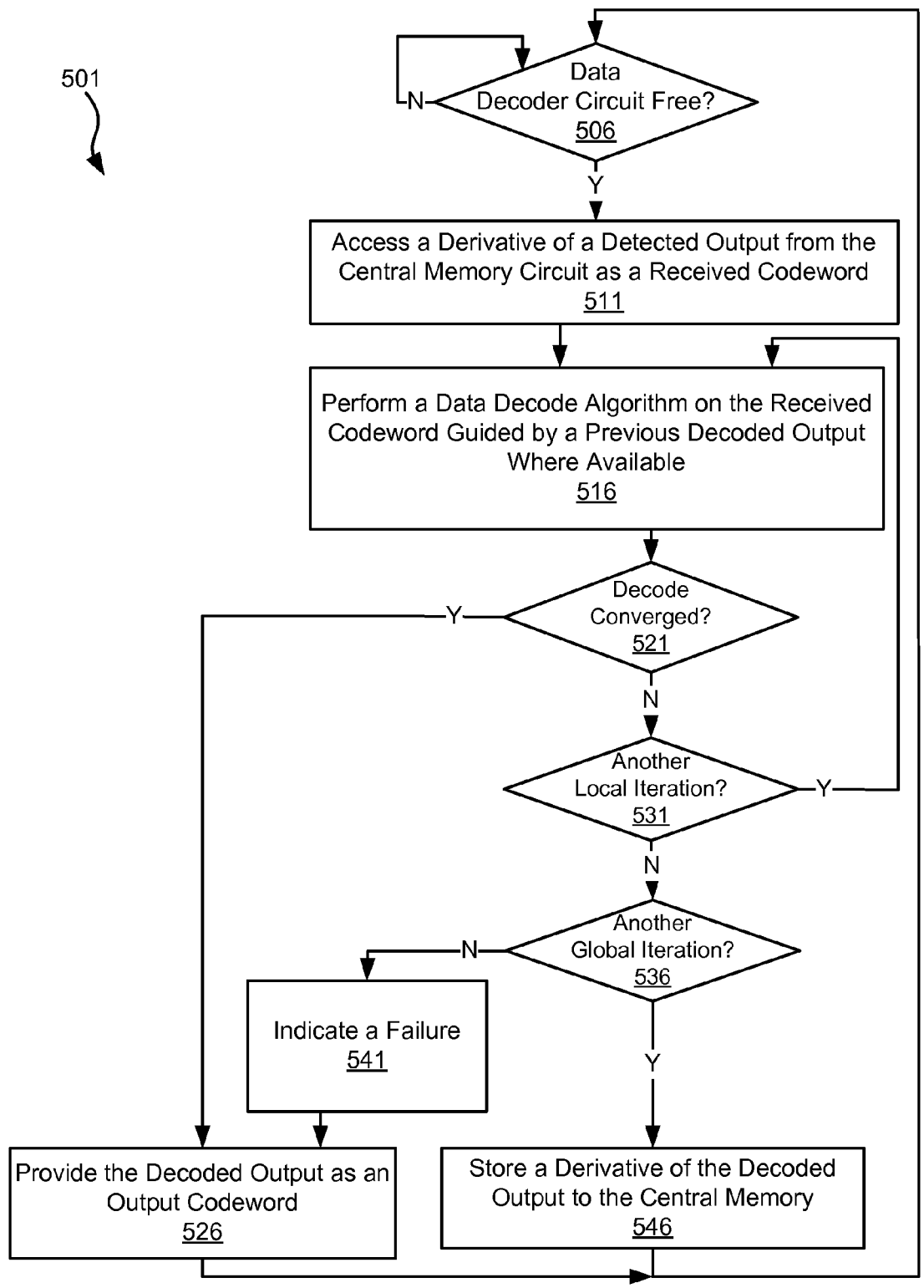

Turning to FIGS. 5a-5b, flow diagrams 500, 501 show a method in accordance with one or more embodiments of the present invention for data processing including short media defect detection. Following flow diagram 500 of FIG. 5a, it is determined whether a decoded output is ready in the central memory to guide re-application of a data detection algorithm to a data processing input, or if a new data processing input is ready for processing (block 505). It is then determined whether a data detector circuit is available (block 510). Where a data detector circuit is available (block 510), the next processing data input is accessed and it is determined whether a decoded output corresponding to the detected output is available from the central memory (block 515). The decoded output is available for the second or later global iterations.

Where a corresponding decoded output is not available (block 515), a data detection algorithm is applied to the processing data input to yield a detected output (block 520). The data detection algorithm may be, but is not limited to, a Viterbi data detection algorithm or a maximum a posteriori data detection algorithm as are known in the art. Based upon the disclosure provided herein, one of ordinary skill in the art will recognize a variety of data detection algorithms that may be used in relation to different embodiments of the present invention.

Alternatively, where a corresponding decoded output is available (block 515) it is accessed (block 525) and a data detection algorithm is applied to the processing data input guided by the corresponding decoded output to yield a detected output (block 530). Such a corresponding decoded output is available for the second or later global iterations for a given processing data input. A non-threshold based symbol data pre-processing is applied to the detected output to yield a suspect symbol indicator (block 535). The suspect symbol indicator is asserted to indicate that a symbol is possibly incorrect based upon a divergence between the detected output and the decoded output. In particular, elements of the soft data included in the decoded output (La) and elements of the soft data included in the detected output (Le) corresponding to each symbol are first combined to yield soft data values for each bit of the symbols. For example, where two bit symbols are processed by the data decoder circuit, there are four soft data values for each symbol of the detected output (i.e., LeQ[0], LeQ[1], LeQ[2], LeQ[3]) and four soft data values for each symbol of the decoded output (i.e., LaQ[0], LaQ[1], LaQ[2], LaQ[3]). Combinations of the aforementioned soft data values are calculated in accordance with the following pseudocode that repeats to process each symbol (i) of a sector:

```
//process each two bit symbol in the sector//
For(i=0 to End of Sector){
    //calculate the maximum of LaQ[0], LaQ[2] minus the maximum of LaQ[1] LaQ[3]//
    La1[i]=max(LaQ[i*4], LaQ[(i*4)+2])-max(LaQ[(i*4)+1], LaQ[(i*4)+3]);
    //calculate the maximum of LaQ[0], LaQ[1] minus the maximum of LaQ[2], LaQ[3]//
    La2[i]=max(LaQ[i*4], LaQ[(i*4)+1])-max(LaQ[(i*4)+2], LaQ[(i*4)+3]);
    //calculate the maximum of LeQ[0], LeQ[2] minus the maximum of LeQ[1] LeQ[3]//
    Le1[i]=max(LeQ[i*4], LeQ[(i*4)+2])-max(LeQ[(i*4)+1], LeQ[(i*4)+3]);
    //calculate the maximum of LeQ[0], LeQ[1] minus the maximum of LeQ[2], LeQ[3]//
    Le2[i]=max(LeQ[i*4], LeQ[(i*4)+1])-max(LeQ[(i*4)+2], LeQ[(i*4)+3]);
    //calculate the minimum of the product of La1[i]*Le1[i] and La2[i]*Le2[i]//
    product = min[(La1[i]*Le1[i]), (La2[i]*Le2[i])];
```

```
// Set the suspect symbol indicator//
If(product <0){
//there was a divergence between La and Le and therefore the symbol is likely incorrect//
    assert the suspect symbol indicator;
}
Else {
//there was not a divergence between La and Le and therefore the symbol is likely correct//
    de-assert the suspect symbol indicator;
}
```

Of note, the aforementioned algorithm can be expanded to handle symbols of three bits or more.

A binary short media defect detection is applied to the pre-processed detected output to determine whether a media defect is likely, and if so to provide a media defect location set (block 540). Such a media defect location set indicates which data in the processing data set corresponds to the likely media defect. The binary short media defect detection may be any media defect detection process known in the art. In one particular embodiment of the present invention, the binary media defect detection processed may be done similar to that disclosed in U.S. Pat. No. 8,201,051 entitled "Method for Detecting Short Burst Errors in LDPC System", issued Jun. 12, 2012 to Tan et al. The entirety of the aforementioned reference is incorporated herein by reference for all purposes. The entirety of the aforementioned reference was previously incorporated herein by reference for all purposes.

Symbols of the detected output corresponding to the media defect location set are scaled to update the detected output (block 545). This scaling operates to modify soft data associated with the effected symbols to reduce the probability that the symbol is considered properly found. By doing this, the likelihood that an effected symbol negatively impacts processing of the data set is reduced and the likelihood that the symbol will be modified by later processing is increased.

All local iterations of a data decode algorithm are then applied to the detected output guided by a previous decoded output where available (block 550). This process generates an updated decoded output that may be used during subsequent global iterations where it does not converge (i.e., have no remaining unsatisfied checks). A derivative of the resulting detected output is stored to the central memory to await processing by a data decoder circuit (block 550). In some cases, the derivative of the detected output is an interleaved or shuffled version of the detected output.

Turning to FIG. 5b and following flow diagram 501, in parallel to the previously described data detection process, it is determined whether a data decoder circuit is available (block 506). The data decoder circuit may be, for example, a low density data decoder circuit as are known in the art. Where the data decoder circuit is available (block 506), a previously stored derivative of a detected output is accessed from the central memory and used as a received codeword (block 511). A data decode algorithm is applied to the received codeword to yield a decoded output (block 516). It is then determined whether the decoded output converged (e.g., resulted in the originally written data as indicated by the lack of remaining unsatisfied checks) (block 521). Where the decoded output converged (block 521), the converged codeword is provided as a decoded output (block 526).

Alternatively, where the decoded output failed to converge (e.g., errors remain) (block 521), it is determined whether another local iteration is desired (block 531). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 531), the data decode algorithm is re-applied using the current decoded output as a guide (block 516).

Alternatively, where another local iteration is not desired (block 531), it is determined whether another global iteration is allowed (block 536). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. For more detail on the output queue time limitation see, for example, U.S. patent application Ser. No. 12/114,462 entitled "Systems and Methods for Queue Based Data Detection and Decoding", and filed May 8, 2008 by Yang et al. The entirety of the aforementioned reference is incorporated herein by reference for all purposes. Thus, the amount of time that a codeword may continue processing through global iterations is a function of the availability of central memory and an output memory reordering queue. By limiting the number of global iterations that may be performed, the amount of time a codeword may continue processing through global iterations can be reduced.

Where another global iteration is allowed (block 536), a derivative of the decoded output is stored to the central memory (block 546). The derivative of the decoded output being stored to the central memory triggers the data set ready query of block 505 to begin the data detection process. Alternatively, where another global iteration is not allowed (block 536), a failure to converge is indicated (block 541), and the current decoded output is provided (block 526).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing defect detection. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A method for data processing, the method comprising:
   receiving a decoded output including a first multi-bit symbol;
   receiving a detected output including a second multi-bit bit symbol;
   using a pre-processing circuit, calculating a first value based upon a first combination of a soft data set corresponding to the first multi-bit symbol and a second value based upon a second combination of the soft data set corresponding to the first multi-bit symbol;
   using the pre-processing circuit, calculating a third value based upon a first combination of a soft data set corresponding to the second multi-bit symbol and a fourth value based upon a second combination of the soft data set corresponding to the second multi-bit symbol;
   multiplying the first value by the third value to yield a first product;
   multiplying the second value by the fourth value to yield a second product; and
   asserting the suspect symbol indicator indicating a probability that the symbol is incorrect when at least one of the first product and the second product is negative.

2. The method of claim 1, wherein:
   the first multi-bit symbol is selected from a group consisting of: a two bit symbol, and a three bit symbol; and
   the second multi-bit symbol is selected from a group consisting of: a two bit symbol, and a three bit symbol.

3. The method of claim 1, wherein the first multi-bit symbol is a two bit symbol; wherein the soft data set corresponding to the first multi-bit symbol includes a first element, a second element, a third element, and a fourth element; and wherein:
   calculating the first value includes:
     selecting one of the first element and the third element that has the highest value as a first selected value;
     selecting one of the second element and the fourth element that has the highest value as a second selected value; and
     subtracting the second selected value from the first selected value to yield the first value;
   calculating the second value includes:
     selecting one of the first element and the second element that has the highest value as a third selected value;
     selecting one of the third element and the fourth element that has the highest value as a fourth selected value; and
     subtracting the fourth selected value from the third selected value to yield the second value.

4. The method of claim 1, wherein the second multi-bit symbol is a two bit symbol; wherein the soft data set corresponding to the second multi-bit symbol includes a first element, a second element, a third element, and a fourth element; and wherein:
   calculating the third value includes:
     selecting one of the first element and the third element that has the highest value as a first selected value;
     selecting one of the second element and the fourth element that has the highest value as a second selected value; and
     subtracting the second selected value from the first selected value to yield the third value;
   calculating the fourth value includes:
     selecting one of the first element and the second element that has the highest value as a third selected value;
     selecting one of the third element and the fourth element that has the highest value as a fourth selected value; and
     subtracting the fourth selected value from the third selected value to yield the fourth value.

5. The method of claim 1, wherein the method further comprises:
   applying a data detection algorithm by a data detector circuit to a data set guided by the decoded output to yield the detected output; and
   applying a data decoding algorithm by a data decoding circuit to a decoder input derived from the detected output to yield the symbol based decoded output.

6. The method of claim 5, wherein the data decoding algorithm is a low density parity check algorithm; and wherein the data detection algorithm is selected from a group consisting of: a maximum a posteriori data detection algorithm, and a Viterbi data detection algorithm.

7. The method of claim 1, wherein the suspect symbol indicator indicates a probability that the first multi-bit symbol is incorrect when at least one of the first product and the second product is negative.

8. A data processing system, the data processing system comprising:
   a data detector circuit operable to apply a data detection algorithm to a symbol based data set guided by a decoded output to yield a detected output, wherein the decoded output includes at least a first multi-bit symbol, and wherein the detected output includes at least a second multi-bit symbol;
   a defect detector circuit including:
   a pre-processing circuit operable to:
     calculate a first value based upon a first combination of a soft data set corresponding to the first multi-bit symbol a second value based upon a second combination of the soft data set corresponding to the first multi-bit symbol;
     calculate a third value based upon a first combination of a soft data set corresponding to the second multi-bit symbol and a fourth value based upon a second combination of the soft data set corresponding to the second multi-bit symbol;
     multiply the first value by the third value to yield a first product;
     multiply the second value by the fourth value to yield a second product; and
     assert a suspect symbol indicator indicating a probability that the symbol is incorrect when at least one of the first product and the second product is negative;
   a binary data detection circuit operable to provide a defect indicator corresponding to a probable defect identified based on the suspect symbol indicator; and
   a data decoder circuit operable to apply a data decode algorithm to a decoder input derived from the detected output modified based on the defect indicator to yield the decoded output.

9. The data processing system of claim 8, wherein the soft data set corresponding to the first multi-bit symbol includes a first element, a second element, a third element, and a fourth element; and wherein:
calculating the first value includes:
selecting one of the first element and the third element that has the highest value as a first selected value;
selecting one of the second element and the fourth element that has the highest value as a second selected value; and
subtracting the second selected value from the first selected value to yield the first value;
calculating the second value includes:
selecting one of the first element and the second element that has the highest value as a third selected value;
selecting one of the third element and the fourth element that has the highest value as a fourth selected value; and
subtracting the fourth selected value from the third selected value to yield the second value.

10. The data processing system of claim 8, wherein the soft data set corresponding to the second two bit symbol includes a first element, a second element, a third element, and a fourth element; and wherein:
calculating the third value includes:
selecting one of the first element and the third element that has the highest value as a first selected value;
selecting one of the second element and the fourth element that has the highest value as a second selected value; and
subtracting the second selected value from the first selected value to yield the third value;
calculating the fourth value includes:
selecting one of the first element and the second element that has the highest value as a third selected value;
selecting one of the third element and the fourth element that has the highest value as a fourth selected value; and
subtracting the fourth selected value from the third selected value to yield the fourth value.

11. The data processing system of claim 8, wherein the multi-bit symbols are selected from a group consisting of: two bit symbols, and three bit symbols.

12. The data processing system of claim 8, wherein the suspect symbol indicator indicates a probability that a symbol is incorrect when a combination of the decoded output and the detected output is negative.

13. The data processing system of claim 8, wherein the system is implemented as an integrated circuit.

14. The data processing system of claim 8, wherein the system is implemented as part of a storage device.

15. The data processing system of claim 8, wherein the data decoder circuit is a low density parity check decoder circuit.

16. The data processing system of claim 8, wherein the data detector circuit is selected from a group consisting of: a Viterbi algorithm data detector circuit, and a maximum a posteriori data detector circuit.

17. A storage device, the storage device comprising:
a storage medium;
a read/write head assembly operable to sense information from the storage medium and to provide a corresponding continuous signal;
an analog to digital converter circuit operable to sample the continuous signal synchronous to a sampling clock to yield a set of digital samples;
an equalizer circuit operable to equalize the set of digital samples and to provide a corresponding symbol based output;
a data detector circuit operable to apply a data detection algorithm to the symbol based output guided by a decoded output to yield a detected output, wherein the decoded output includes at least a first multi-bit symbol, and wherein the detected output includes at least a second multi-bit symbol;
a defect detector circuit including:
a pre-processing circuit operable to:
calculate a first value based upon a first combination of a soft data set corresponding to the first multi-bit symbol a second value based upon a second combination of the soft data set corresponding to the first multi-bit symbol;
calculate a third value based upon a first combination of a soft data set corresponding to the second multi-bit symbol and a fourth value based upon a second combination of the soft data set corresponding to the second multi-bit symbol;
multiply the first value by the third value to yield a first product;
multiply the second value by the fourth value to yield a second product; and
assert a suspect symbol indicator indicating a probability that the symbol is incorrect when at least one of the first product and the second product is negative;
a binary data detection circuit operable to provide a defect indicator corresponding to a probable defect identified based on the suspect symbol indicator; and
a data decoder circuit operable to apply a data decode algorithm to a decoder input derived from the detected output modified based on the defect indicator to yield the decoded output.

18. The storage device of claim 17, wherein the soft data set corresponding to the first multi-bit symbol includes a first element, a second element, a third element, and a fourth element; and wherein:
calculating the first value includes:
selecting one of the first element and the third element that has the highest value as a first selected value;
selecting one of the second element and the fourth element that has the highest value as a second selected value; and
subtracting the second selected value from the first selected value to yield the first value;
calculating the second value includes:
selecting one of the first element and the second element that has the highest value as a third selected value;
selecting one of the third element and the fourth element that has the highest value as a fourth selected value; and
subtracting the fourth selected value from the third selected value to yield the second value.

19. The storage device of claim 17, wherein the soft data set corresponding to the second two bit symbol includes a first element, a second element, a third element, and a fourth element; and wherein:
calculating the third value includes:
selecting one of the first element and the third element that has the highest value as a first selected value;
selecting one of the second element and the fourth element that has the highest value as a second selected value; and
subtracting the second selected value from the first selected value to yield the third value;

calculating the fourth value includes:
  selecting one of the first element and the second element that has the highest value as a third selected value;
  selecting one of the third element and the fourth element that has the highest value as a fourth selected value; and
  subtracting the fourth selected value from the third selected value to yield the fourth value.

20. The storage device of claim 17, wherein the multi-bit symbols are selected from a group consisting of: two bit symbols, and three bit symbols.

* * * * *